United States Patent
Warth et al.

(10) Patent No.: US 8,242,197 B2
(45) Date of Patent: Aug. 14, 2012

(54) BLEND OF AROMATIC POLYCARBONATE AND POLYLACTIC ACID, THE METHOD FOR PREPARING THE SAME AND THE USE THEREOF

(75) Inventors: Holger Warth, Hong Kong (HK); Sichong Chen, Chengdu (CN); Yuzhong Wang, Chengdu (CN); Yanyan Wang, Chengdu (CN); Hongchao Li, Shanghai (CN)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 12/555,264

(22) Filed: Sep. 8, 2009

(65) Prior Publication Data
US 2010/0081739 A1 Apr. 1, 2010

(30) Foreign Application Priority Data
Sep. 11, 2008 (CN) .......................... 2008 1 0042811

(51) Int. Cl.
| C08K 5/34   | (2006.01) |
| C08K 5/3492 | (2006.01) |
| C08K 5/09   | (2006.01) |
| C08K 5/24   | (2006.01) |
| C08K 5/49   | (2006.01) |
| C08K 5/51   | (2006.01) |
| C08K 5/52   | (2006.01) |
| C08K 3/30   | (2006.01) |
| C08K 3/38   | (2006.01) |
| C08F 283/08 | (2006.01) |

(52) U.S. Cl. ............ 524/398; 524/86; 524/99; 524/100; 524/127; 524/146; 524/147; 524/261; 524/405; 524/418; 524/508; 524/537

(58) Field of Classification Search ............... 524/86, 524/127, 146, 147, 261, 405, 418, 508, 537, 524/99, 100, 398
See application file for complete search history.

(56) References Cited

U.S. PATENT DOCUMENTS

| 3,553,167 A | 1/1971 | Schnell et al. |
| 4,075,173 A | 2/1978 | Maruyama et al. |
| 4,311,823 A | 1/1982 | Imai et al. |
| 5,064,935 A | 11/1991 | Jackson |
| 2008/0262151 A1 | 10/2008 | Ishii et al. |
| 2010/0179286 A1* | 7/2010 | Oda et al. ...................... 525/186 |

FOREIGN PATENT DOCUMENTS

| DE | 3832396 | 2/1990 |
| EP | 1792941 | 6/2007 |
| JP | 2006028299 | 2/2006 |
| JP | 2006111858 | 4/2006 |
| JP | 2006199743 | 8/2006 |
| JP | 2007056247 | 3/2007 |

OTHER PUBLICATIONS

International Search Report and Written Opinion if the International Searching Authority based on PCT/EP2009/006459 dated Jan. 15, 2009.

* cited by examiner

*Primary Examiner* — Kriellion Sanders
(74) *Attorney, Agent, or Firm* — Baker Donelson Bearman Caldwell & Berkowitz, PC

(57) ABSTRACT

The present disclosure pertains to a blend of aromatic polycarbonate and polylactic acid, the method for preparing the same and the use thereof. In the present invention a transesterification catalyst is added during the preparing process with regard to the blend of aromatic polycarbonate and polylactic acid to improve the compatibility of the components in the blend. The blend of aromatic polycarbonate and polylactic acid is provided with the good mechanical properties, thermal processibility and flame retardance properties, and can be widely applied to mechanical product or parts, electronic equipments and/or parts, construction material and/or commodities.

23 Claims, No Drawings

BLEND OF AROMATIC POLYCARBONATE AND POLYLACTIC ACID, THE METHOD FOR PREPARING THE SAME AND THE USE THEREOF

CROSS REFERENCE TO RELATED APPLICATION

This application claims priority to Chinese Patent Application 200810042811.2 filed Sep. 11, 2009, the content of which is incorporated herein by reference in its entirety.

TECHNICAL FIELD

The present invention pertains to resin, especially a blend of aromatic polycarbonate and polylactic acid, as well as methods for preparing the same and uses thereof.

BACKGROUND

Aromatic polycarbonate is a polymer exhibiting good transparency, mechanical properties (such as impact resistance) and flame retardance property. This polymer is widely applied to engineering plastics and construction material, however, the thermal processability of the polymer is not sufficient for certain applications.

Polylactic acid is a polymer possessing good biodegradability and tensile strength. This polymer is suitable for applications in the fields of biomedical materials and environmental-friendly materials. In addition, polylactic acid can be recycled easily. Lactic acid, the monomer of the polylactic acid, can be prepared by renewable natural resources (such as starch). Nevertheless, polylactic acid is not only a brittle and low impact resistance material, but also possesses a low melt viscosity.

Blending the aromatic polycarbonate and polylactic acid is a feasible method to combine the advantages of these two polymers, however, the poor compatibility between the polymers will cause a obvious phase separation and significantly reduce the mechanical properties of the blend.

JP2007056247, JP2006111858 and JP2006199743 disclosed a method to improve the performance of the blend of aromatic polycarbonate and polylactic acid by adding a compatibilizer, wherein, the compatibilizer comprises a graft copolymer based on acrylic resin or styrene resin, a copolymer based on glycidyl or anhydride, and a vinyl graft copolymer. Although the compatibilizer improved the mechanical properties of the blend of aromatic polycarbonate and polylactic acid, the compatibilizer increased the cost for preparing the blend of aromatic polycarbonate and polylactic acid.

JP2006028299 and EP1792941 disclosed a method to improve the compatibility of the blend of aromatic polycarbonate and polylactic acid by adding chain extender, wherein, the chain extender included diisocyanate, bisphenol A epoxy oligomer and carbodiimide. However, this method would significantly increase the molecular weight of the blend of aromatic polycarbonate and polylactic acid, increase the melt viscosity of the blend accordingly and make it more difficult to process the blend.

Therefore, an object was to provide an economical blend of aromatic polycarbonate and polylactic acid with improved mechanical properties, as well as to methods for preparing the same.

Moreover, it was an object to provide mechanical products and/or parts, electronic equipments and/or parts, construction materials and/or commodities comprising a blend of aromatic polycarbonate and polylactic acid, as well as uses of the blend of aromatic polycarbonate and polylactic acid in preparing mechanical products and/or parts, electronic equipments and/or parts, construction material, and/or commodities.

SUMMARY

These and other objects can be solved by a blend of aromatic polycarbonate and polylactic acid, comprising the blending product of components of:
(a) 5-95 weight parts of an aromatic polycarbonate, based on 100 weight parts of component (a) and (b);
(b) 95-5 weight parts of a polylactic acid, based on 100 weight parts of component (a) and (b); and
(c) 0.05-1 weight parts of a transesterification catalyst, based on 100 weight parts of component (a) and (b).

The blend can further comprise
(d) 1-25 weight parts of a flame retardant, based on 100 weight parts of component (a) and (b); and
(e) 0.3-2 weight parts of a fluorine-based resin, preferably 0.5-2 weight parts, based on 100 weight parts of component (a) and (b).

The blend can further comprise
(f) 0.5-10 weight parts of an additive, based on 100 weight parts of component (a) and (b); wherein, the additive is selected from the group consisting of lubricants, mold-release agents, nucleating agents, stabilizers, fillers, reinforcing agents, antistatic agents, dyestuff, and/or pigments.

Further an underlying problem can be solved by employing a method for preparing a blend of aromatic polycarbonate and polylactic acid, comprising blending the components of (a), (b) and (c):
(a) 5-95 weight parts of an aromatic polycarbonate, based on 100 weight parts of component (a) and (b);
(b) 95-5 weight parts of a polylactic acid, based on 100 weight parts of component (a) and (b); and
(c) 0.05-1 weight parts of a transesterification catalyst, based on 100 weight parts of component (a) and (b).

The method can further comprise adding
(d) 1-25 weight parts of a flame retardant, based on 100 weight parts of component (a) and (b); and/or
(e) 0.3-2 weight parts of a fluorine-based resin, preferably 0.5-2 weight parts, based on 100 weight parts of component (a) and (b).

The method can further comprise adding
(f) 0.5-10 weight parts of an additive, based on 100 weight parts of component (a) and (b); the additive is selected from the group consisting of lubricants, mold-release agents, nucleating agents, stabilizers, fillers, reinforcing agents, antistatic agents, dyestuffs, and/or pigments.

Advantages of the compositions of the present disclosure include the fact that due to the transesterification catalyst being added during the process for the blend of aromatic polycarbonate and polylactic acid, the compatibility of the blend components is improved. The blend of aromatic polycarbonate and polylactic acid is provided with good mechanical properties, thermal processibility and flame retardance property. The blend of aromatic polycarbonate and polylactic acid can be widely applied to mechanical products and/or parts, electronic equipments and/or parts, construction material, and/or commodities

DETAILED DESCRIPTION

The blend of aromatic polycarbonate and polylactic acid provided comprises a blending product of components a, b and c.

Component a

The component a is an aromatic polycarbonate. The weight-average molecular weight of the aromatic polycarbonate (measured by gel permeation chromatography) can be selected from, but not limited to, 10,000-200,000, preferably 15,000-80,000, most preferably 24,000-32,000.

The aromatic polycarbonate can be prepared, for example, by a method disclosed in DE-A 1495626, DE-A 2232877, DE-A 2703376, DE-A 2714544, DE-A 3000610 and DE-A 3832396.

The aromatic polycarbonate can be prepared, for example, by conversion of aromatic dihydroxy compounds (hereinafter referred to diphenols) with carbonic acid dihalide and/or with aromatic dicarboxylic acid dihalides. The carbonic acid halide, can be, but is not limited to, phosgene. The aromatic dicarboxylic acid dihalides, can be selected from the group of, but are not limited to, benzenedicarboxylic acid dihalides. In accordance with the phase-boundary process, chain terminators or branching agents can be further optionally used. The chain terminators can be selected from, but not limited to, monophenols. The branching agents, can be selected from, but are not limited to, trifunctional or more than trifunctional branching agents, more preferably triphenols or tetraphenols. Similarly, the aromatic polycarbonate can also be prepared via a melt-polymerization process by conversion of diphenols with diphenyl carbonate.

The diphenols can suitably be those of formula (I)

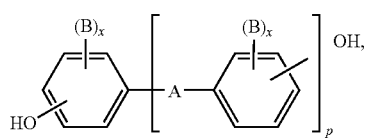

wherein,

A is a single bond, preferably $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene. A can further optionally include aromatic rings, heteroatoms, or a residue of the formula (II) or (III).

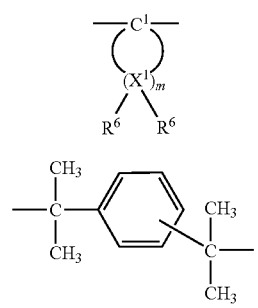

B can be selected from, but is not limited to, $C_1$ to $C_{12}$ alkyl or halogen; the $C_1$ to $C_{12}$ alkyl can be selected from, but not limited to, methyl; the halogen can be selected from, but not limited to, chlorine and/or bromine;

x is, in each instance, independently of one another, 0, 1 or 2;

p is 1 or 0;

$R_5$ and $R_6$ are individually selected for each $X_1$ and are, independently of one another, hydrogen or $C_1$ to $C_6$ alkyl, preferably hydrogen, methyl or ethyl;

$X_1$ is carbon; and m signifies an integer of 4 to 7, preferably 4 or 5, with the proviso that, on at least one atom $X_1$, $R_5$ and $R_6$ are simultaneously alkyl.

The diphenols can be selected from, but are not limited to, hydroquinone, resorcinol, dihydroxydiphenols, bis(hydroxyphenyl)-$C_1$-$C_3$-alkanes, bis(hydroxyphenyl)-$C_5$-$C_6$-cycloalkanes, bis(hydroxyphenyl)ethers, bis(hydroxyphenyl)sulfoxides, bis(hydroxyphenyl)ketones, bis(hydroxyphenyl)sulfones, α,α-bis(hydroxyphenyl)diisopropylbenzenes and also the ring-brominated and/or ring-chlorinated derivatives thereof. Particularly preferred as diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenylsulfide, 4,4'-dihydroxydiphenylsulfone and also the dibrominated and tetrabrominated or chlorinated derivatives thereof, such as, 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Most preferred as diphenol is 2,2-bis(4-hydroxyphenyl)propane (bisphenol A). The diphenols may be employed individually or in the form of arbitrary mixtures. The diphenols are known from the literature or can be obtained by known processes.

The chain terminators can be selected from, but are not limited to, p-chlorophenol, p-tert.-butylphenol, long-chain alkylphenols; the long-chain alkylphenols can be selected from, but are not limited to, 4-[2-(2,4,4-trimethylpentyl)]phenol, 4-(1,3-tetramethylbutyl)phenol, monoalkylphenol, dialkylphenols with a total of 8 to 20 C atoms in the alkyl substituents, such as 3,5-di-tert.-butylphenol, p-iso-octylphenol, p-tert.-octylphenol, p-dodecylphenol and 2-(3,5-dimethylheptyl)phenol and 4-(3,5-dimethylheptyl)phenol. The amount of the chain terminators to be employed is 0.5-10 mol %, based on 100 mol % of the diphenols employed in the given case.

The aromatic polycarbonates may be branched in known manner, preferably through the incorporation of 0.05 mol % to 2.0 mol % of compounds having functionalities of three or more, based on 100 mol % of the diphenols employed; the compounds having three or more functionalities have preferably three and more phenolic groups.

The dicarboxylic acid dihalides can be selected from, but are not limited to, the di-acid dichlorides of isophthalic acid, of terephthalic acid, of diphenyl ether 4,4'-dicarboxylic acid and of naphthalene-2,6-dicarboxylic acid; more preferably the mixtures of the di-acid dichlorides of isophthalic acid and of terephthalic acid in a ratio between 1:20 and 20:1.

The aromatic polycarbonates, can be selected from the group of, but are not limited to, bisphenol-A polycarbonates.

The amount of the aromatic polycarbonates to be employed is 5-95 weight parts, preferably 50-90 weight parts, more preferably 70-90 weight parts, based on 100 weight parts of component a and b.

Component b

The component b is a polylactic acid. The component b can be selected from, but is not limited to, poly L-lactic acid, poly D-lactic acid or the mixture thereof. The weight-average molecular wight of the polylactic acid (measured by gel permeation chromatography) can be selected from but is not limited to, 15,000-1,000,000, preferably 40,000 to 100,000, more preferably 80,000-100,000.

There is no special limitation with regard to the purity of the polylactic acid, preferably the polylactic acid comprising 80 wt. % or more poly L-lactic acid and/or poly D-lactic acid, more preferably the polylactic acid comprising 90 wt. % or more poly L-lactic acid and/or poly D-lactic acid.

The amount of the polylactic acid to be employed is 95-5 weight parts, preferably 50-10 weight parts, more preferably 30-10 weight parts, based on 100 weight parts of component a and b.

Component c

The component c is a transesterification catalyst. The transesterification catalyst is the catalyst which can accelerate the transesterification between the aromatic polycarbonates and the polylactic acid. The transesterification catalyst can be selected from, but is not limited to, lewis-acids, nitrogen-containing compounds, alkali metal salts, and alkaline earth metal salts.

The lewis acids can be selected from, but are not limited to, tin compounds, titanium compounds, antimony compounds, zinc compounds and boron compounds. The tin compounds can be selected from, but are not limited to, dibutyltin oxide, tin oxalate and tin acetate; the titanium compounds can be selected from, but are not limited to, tetrabutyl titanate, tetraphenyl titanate, titanium oxalate and titanium dioxide; the antimony compounds can be selected from, but are not limited to, antimony trioxide and tartrate antimonyl salt; the zinc compounds can be selected from, but are not limited to, zinc stearate and zinc acetylacetonate; the boron compounds can be selected from, but are not limited to, triphenylboron and zinc borate.

The nitrogen-containing compounds can be selected from, but are not limited to, quaternary amine hydroxide, tertiary amine, secondary amine, primary amine and nitrogenous heterocyclic compounds. The quaternary amine hydrate can be signified by a general formula $NR_4^+(OH^-)$, wherein R is an alkyl or aryl containing 1-25 carbon atoms. The quaternary amine hydrate can be selected from, but are not limited to, tetramethylamine hydroxide, tetraethylamine hydroxide, tetrabutylamine hydroxide, tetraaniline hydroxide. The tertiary amine can be selected from, but is not limited to, The tertiary amine can be signified by a general formula $NR_3$, wherein R is an alkyl or aryl containing 1-25 carbon atoms. The tertiary amine can be selected from, but is not limited to, trimethylamine, triethylamine, trioctylamine, triphenylamine, diphenyl methylamine. The secondary amine can be signified by a general formula $NHR_2$, wherein R is an alkyl or aryl containing 1-25 carbon atoms. The secondary amine can be selected from, but is not limited to, di-n-propylamine and diphenylamine. The primary amine can be signified by a general formula $NH_2R$, wherein R is an alkyl or aryl containing 1-25 carbon atoms. The primary amine can be selected from, but is not limited to, n-octylamine and aniline. The nitrogenous heterocyclic compounds can be selected from, but are not limited to, pyridine, methylpyridine, methoxy pyridine, quinoline and imidazole.

The alkali metal salts can be selected from, but are not limited to, hydroxide of alkali metal, hydride of alkali metal, amide of alkali metal, carbonate of alkali metal, phosphate of alkali metal, borate of alkali metal and organic salt of alkali metal. The organic salt of alkali metal can be selected from, but are not limited to, organic acid salt of alkali metal, phenolate of alkali metal and alkoxide of alkali metal. The alkali metal can be selected from the group of lithium, natrium and kalium.

The alkaline earth metal salts can be selected from, but are not limited to, hydroxide of alkaline earth metal, hydride of alkaline earth metal, amide of alkaline earth metal, carbonate of alkaline earth metal, phosphate of alkaline earth metal, borate of alkaline earth metal and organic salt of alkaline earth metal. The organic salt of alkaline earth metal can be selected from, but are not limited to, organic acid salt of alkaline earth metal, phenolate of alkaline earth metal and alkoxide of alkaline earth metal. The alkaline earth metal can be selected from, but not limited to, magnesium, calcium and barium.

More preferred as transesterification catalyst is lewis acids, most preferred as transesterification catalyst is tetrabutyl titanate and dibutyltin oxide.

The amount of the transesterification catalyst to be employed is 0.05-1 weight parts, preferably 0.1-0.5 weight parts, more preferably 0.1-0.2 weight parts, based on 100 weight parts of component a and b.

Components d and e

In the present invention, the components of the blend of aromatic polycarbonate and polylactic acid can further optionally comprise component d and e.

The component d is a flame retardant. The flame retardant can improve the flame retardance property of the blend of aromatic polycarbonate and polylactic acid. The flame retardant can be selected from, but not limited to, bromine based flame retardant, phosphorous based flame retardant, nitrogen compound based flame retardant, silicon based flame retardant and other inorganic flame retardant.

The bromine based flame retardant can be selected from, but not limited to, tetrabromine bisphenol-A epoxy oligomers, tetrabromine bisphenol-A carbonate oligomers and brominated epoxy resins.

The phosphorous based flame retardant can be selected from, but not limited to, phosphate esters, polyphosphate esters and organic phosphate salts. Preferably the phosphorous based flame retardants are chosen from the groups of mono- and oligomeric phosphoric and phosphonic acid esters, phosphonatamines and phosphazenes.

Preferred mono- and oligomeric phosphoric or phosphonic acid esters include phosphorus compounds of formula (VIII)

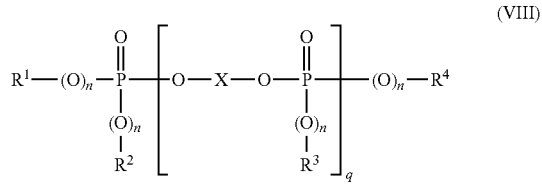

wherein $R^1$, $R^2$, $R^3$ and $R^4$ independently of one another denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, preferably $C_1$ to $C_4$-alkyl, and/or halogen, preferably chlorine or bromine, n independently of one another denotes 0 or 1, q denotes 0 to 30 and X denotes a mono- or polynuclear aromatic radical having 6 to 30 C atoms, or a linear or branched aliphatic radical having 2 to 30 C atoms, which can be substituted by OH and can contain up to 8 ether bonds.

Preferably, $R^1$, $R^2$, $R^3$ and $R^4$ independently of one another represent $C_1$ to $C_4$-alkyl, phenyl, naphthyl or phenyl-$C_1$-$C_4$-alkyl. The aromatic groups $R^1$, $R^2$, $R^3$ and $R^4$ can in turn be substituted by halogen groups and/or alkyl groups, preferably chorine, bromine and/or $C_1$ to $C_4$-alkyl. Particularly preferred aryl radicals are cresyl, phenyl, xylenyl, propylphenyl or butylphenyl and the corresponding brominated and chlorinated derivatives thereof.

X in the formula (VIII) preferably denotes a mono- or polynuclear aromatic radical having 6 to 30 C atoms. This is preferably derived from diphenols of the formula (I).

n in the formula (VIII) can be, independently of one another, 0 or 1, and preferably n is 1.

q represents values from 0 to 30, preferably 0.3 to 20, particularly preferably 0.5 to 10, in particular 0.5 to 6, very particularly preferably 1.05 to 1.6, most preferably 1.05 to 1.2.

X particularly preferably represents

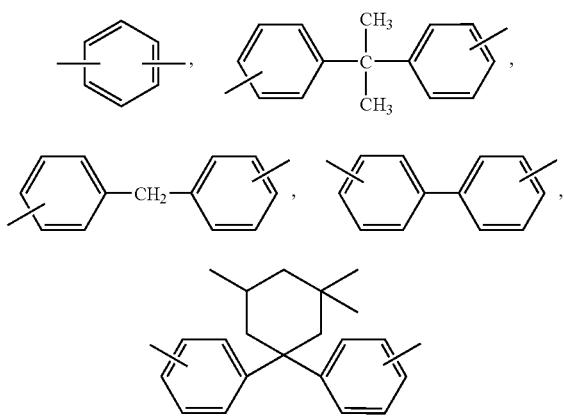

or chlorinated or brominated derivatives thereof, and in particular X is derived from resorcinol, hydroquinone, bisphenol A or diphenylphenol. Particularly preferably, X is derived from bisphenol A.

Mixtures of various phosphates can also be employed as component e according to the invention.

Phosphorus compounds of the formula (VIII) can, in particular, be tributyl phosphate, triphenyl phosphate, tricresyl phosphate, diphenyl cresyl phosphate, diphenyl octyl phosphate, diphenyl 2-ethylcresyl phosphate, tri-(isopropylphenyl)phosphate, resorcinol-bridged oligophosphate and bisphenol A-bridged oligophosphate. The use of oligomeric phosphoric acid esters of the formula (VIII) which are derived from bisphenol A is particularly preferred.

Bisphenol A-based oligophosphate according to formula (VIIIa)

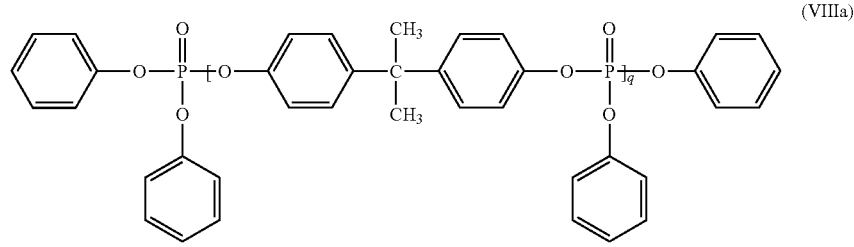

(VIIIa)

wherein q in formula (VIIIa) represents values from 1.05 to 1.2 are most preferred as component e.

The phosphorus compounds according to component e are known (cf. e.g. EP-A 0 363 608, EP-A 0 640 655) or can be prepared in an analogous manner by known methods (e.g. Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

If mixtures of various phosphorus compounds are employed, and in the case of oligomeric phosphorus compounds, the q value stated is the average q value. The average q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

Phosphonatamines and phosphazenes such as are described in WO-A 00/00541 and WO-A 01/18105 can furthermore be employed as flameproofing agents.

A nitrogen compound based flame retardant can be selected from, but is not limited to, nitrogenous heterocyclic compounds.

A silicon based flame retardant can be selected from, but is not limited to, silicone resins and silicone oils.

Other inorganic flame retardant that could potentially be used can be selected from, but is not limited to, aluminum hydroxide, zinc borate and expanded graphite.

The flameproofing agents can be employed by themselves or in any desired mixture with one another or in a mixture with other flameproofing agents.

The amount of the flame retardant to be employed is advantageously 1-25 weight parts, preferably 2-20 weight parts, more preferably 3-15 weight parts, and most preferably 5-15 weight parts, based on 100 weight parts of component a and b.

The optional component e is fluorine-based resin. The fluorine-based resin can improve the anti-dropping property during combustion with regard to the blend of aromatic polycarbonate and polylactic acid.

The fluorine-based resin can be selected from, but not limited to, C—C backbone polymer which contains fluorine in its repeating unit. Preferred as fluorine-based resin is a mixed powder of polytetrafluoroethylene, wherein the mixed powder of polytetrafluoroethylene consists of polytetrafluoroethylene and organic polymer. The organic polymer can be selected from, but not limited to, styrene acrylonitrile copolymer. Preferred as the weight-average molecular weight of the fluorine-based resin is 100,000-1,000,000.

Further suitable organic polymers are, for example, polyacrylates. PTFE is present in the above mentioned blends (mixing powders) in proportions of from 30 to 70 wt. %, preferably 40 to 60 wt. % and most particularly from 40 to 55 wt. %.

Suitable blends are commercially obtainable, for example under the trade names Blendex® 449 from GE Speciality Chemicals or the Metablen-A Series from Mitsubishi Rayon. The blends can be prepared by mixing a PTFE emulsion with an emulsion of the suitable blend partner. By means of a suitable process such as coagulation, freeze drying, spray drying and the like, the blend is obtained from the mixture which has been obtained.

The amount of the fluorine-based resin to be employed is 0.3-2 weight parts, more preferably 0.5-2 weight parts, still more preferably 0.5-1.5 weight parts, and most preferably 1.0-1.5 weight parts, based on 100 weight parts of component a and b.

Component f

In the present invention, the components of the blend of aromatic polycarbonate and polylactic acid can further optionally comprise component f.

The component f is an additive. The additive is at least one selected from the group consisting of lubricants, mold-release agents (for example, pentaerythritol tetrastearate), nucleating agents, stabilizers, fillers, reinforcing agents, antistatic agents (for example, conductive carbon blacks, carbon fibers, metal fibers, carbon nanotubes and also organic antistatic agents such as polyalkylene ethers, alkyl sulfonates or polyamide-containing polymers), dyestuffs, and pigments.

The amount of the additive to be employed is preferably 0.5-10 weight parts, more preferably 0.5-5 weight parts, based on 100 weight parts of component a and b.

A suitable method for preparation and uses thereof.

The present method for preparing the blend of aromatic polycarbonate and polylactic acid suitably comprises blending the components a, b and c to obtain the blend of aromatic polycarbonate and polylactic acid.

The components can further optionally comprise components d and e.

The components can further optionally comprise component f.

After being blended, the components can be melt blended to obtain the blend of aromatic polycarbonate and polylactic acid. The melt blending temperature is advantageously equal to or more than the melting point of the component b, and also advantageously less than the decomposition temperature of the component b. A suitable melt blending temperature can be determined by the ratio between the aromatic polycarbonate and polylactic acid, the higher the content of the aromatic polycarbonate, the higher the melt blending temperature should be. The melt blending temperature can be selected from, but not limited to, 210-260° C., preferably 220-230° C.

The blend of aromatic polycarbonate and polylactic acid can be processed to various products by any method such as by extrusion molding, injection molding, blow molding, spinning into fibre, etc. For example, by way of extrusion molding, the blend of aromatic polycarbonate and polylactic acid can be made, for example, into film, blowing film, flake, pipe, stick, string, fibre and/or other kinds of extrusion molding products. For another example, the blend of aromatic polycarbonate and polylactic acid can also be processed into different shapes of injection molding products by way of injection molding.

The blend of aromatic polycarbonate and polylactic acid can be used to make mechanical product and/or parts, electronic equipments and/or parts, construction material and/or commodities. The mechanical products and/or parts include, but are not limited to, a fixture, bearing, gear, valve, stent, base, pallet and/or engine components of a mechanical equipment. The electronic equipments or parts include, but are not limited to, a shell, cover cap, parts, switch, stent, base and/or a pallet of electronic equipment. The construction material includes, but is not limited to, a membrane plate, sunlight panel, endurance panel, light box, window frame, and/or a curtain wall. The commodities include, but not are limited to, a food container, liquid container, toy, office appliance, sports goods and/or a compact disc.

EXAMPLES

The following examples were used to illustrate the present invention. The purpose for providing the following examples was only to illustrate the present invention, but not to limit the scope of the present invention. Without special description, the numbers listed in the Tables corresponding to the examples were all weight parts values.

The properties listed in the examples were tested by the following methods.

(1) Tensile Properties

A sample, the thickness of which was 4.0 mm, for tensile experiment was made by way of injection molding. The tensile modulus and the breaking elongation of the sample were tested in accordance with ISO 527 method (50 mm/min).

(2) Impact Properties

A sample, the thickness of which was 4.0 mm, for impact strength experiment was made by way of injection molding. The impact strength of the sample was tested in accordance with ISO 180-1A method (23° C., 5.5 J).

(3) Melting Indexes

A plastic granule was used to test the melting index in accordance with ISO 1133 method (240° C., 5 Kg).

(4) Flame Retardant Properties

A sample with dimension of 127 mm×12.7 mm×3.2 mm for burning experiment was made by way of injection molding. The flame retardant property was tested in accordance with US standard UL-94 Vertical Burning Experiment Method. From top to low, the ranks of the flame retardance properties were graded from V-0, V-1 to V-2. Samples inconsistent with the aforementioned ratings were deemed to be out of the standard.

Examples 1-6

Comparative Examples C1-C5

Table 1 was in accordance with the Examples 1-4 and the Comparative Examples C1-C3.

Table 2 was in accordance with the Examples 5-6 and the Comparative Examples C4-C5.

The following components were blended in accordance with the data listed in Table 1 and Table 2:

(a) bisphenol-A polycarbonate resin having a weight-average molecular weight of 26,000, wherein the weight-average molecular weight was measured by GPC and equated according to the polystyrene standard sample;

(b) polylactic acid having a weight-average molecular of 100,000, wherein the weight-average molecular weight was measured by GPC and equated according to the polystyrene standard sample;

(c) tetrabutyl titanate, wherein the purity thereof was 99.5%.

By using a 25 mm diameter twin-screw extruder, under the condition of a cylinder temperature 220° C. and a rotation speed of 90 rpm, the blended components were melt blended and taken up from a die as a melted strand, cooled by cooling air, and then a pelletized resin composition was obtained from a standard cutter.

The properties with regard to the blend of aromatic polycarbonate and polylactic acid were tested in accordance with the method mentioned in (1)-(4). The test results were listed in Table 1 and Table 2.

TABLE 1

Examples 1-4 and Comparative Examples C1-C3

|  |  | Examples | | | | Comparative Examples | | |
| --- | --- | --- | --- | --- | --- | --- | --- | --- |
|  |  | 1 | 2 | 3 | 4 | C1 | C2 | C3 |
| Bisphenol-A polycarbonate (a) | weight parts | 80 | 80 | 80 | 80 | 0 | 100 | 80 |
| Polylactic acid (b) | weight parts | 20 | 20 | 20 | 20 | 100 | 0 | 20 |
| Tetrabutyl titanate (c) | weight parts | 0.1 | 0.2 | 0.5 | 1.0 | 0 | 0 | 0 |
| Tensile modulus | MPa | 2627 | 2687 | 2726 | 2792 | 3560 | 2447 | 2617 |
| Breaking elongation | % | 106.0 | 113.3 | 120.1 | 130.0 | 6.4 | 118.1 | 93.0 |
| Melt Volume Rate (MVR) | cm$^3$/10 min | 7.8 | 13.6 | 13.9 | 10.5 | 41.2 | 10.8 | 9.1 |
| Impact strength | kJ/m$^2$ | 7.4 | 6.8 | 6.3 | 2.3 | 2.7 | 67.0 | 7.2 |

According to Examples 1-4 and Comparative Examples C1-C3,

The resin comprising pure aromatic polycarbonate (for example, bisphenol-A polycarbonate) exhibited good tensile modulus, breaking elongation and impact strength. However, the melt flow of the aromatic polycarbonate resin was poor; namely, the thermal processibility thereof was poor.

The resin comprising pure polylactic acid (for example, poly L-lactic acid) showed good melt fluidity and tensile properties. However, the breaking elongation and impact strength of the polylactic acid resin was poor; namely, the polylactic acid resin was fragile.

The compatibility of the blend of aromatic polycarbonate and polylactic acid (without transesterification catalyst, C3) was poor, therefore, the breaking elongation and anti-tensile property thereof was not ideal.

Because of the improvement with regard to the compatibility, the blend of aromatic polycarbonate, polylactic acid and transesterification catalyst (for example, tetrabutyl titanate) combines the features of good impact strength, breaking elongation, anti-tensile property and melt fluidity.

TABLE 2

Examples 5-6 and Comparative Examples C4-C5

|  |  | Examples | | Comparative Examples | |
| --- | --- | --- | --- | --- | --- |
|  |  | 5 | 6 | C4 | C5 |
| Bisphenol-A polycarbonate (a) | weight parts | 90 | 10 | 90 | 10 |
| Polylactic acid (b) | weight parts | 10 | 90 | 10 | 90 |
| Tetrabutyl titanate (c) | weight parts | 0.5 | 0.5 | 0 | 0 |
| Tensile modulus | MPa | 2618 | 3536 | 2496 | 3449 |
| Breaking elongation | % | 101.9 | 39.0 | 85.0 | 35.3 |
| Melt Volume Rate (MVR) | cm$^3$/10 min | 22.9 | 105.2 | 9.8 | 64.9 |
| Impact strength | kJ/m$^2$ | 6.2 | 3.2 | 7.3 | 3.5 |

According to Example 5 and Comparative Example 4,

The tensile modulus and the breaking elongation with regard to the blend of aromatic polycarbonate and polylactic acid comprising a high content of aromatic polycarbonate (for example, bisphenol-A polycarbonate), a low content of polylactic acid (for example, poly L-lactic acid) and transesterification catalyst (for example, tetrabutyl titanate) was better than the tensile modulus and the breaking elongation with regard to the blend of aromatic polycarbonate and polylactic acid comprising aromatic polycarbonate and polylactic acid and no transesterification catalyst.

In summary, the compatibility of the blend could be improved by adding a transesterification catalyst. Thus the blend of aromatic polycarbonate, polylactic acid and transesterification catalyst not only possesses the benefits of aromatic polycarbonate but also the benefits of polylactic acid. The blend has a good balance of physical properties.

Examples 7-11

Comparative Example C6

Table 3 was in accordance with the Examples 7-11 and the Comparative Example C6.

The following components were blended in accordance with the data listed in Table 3:

(a) bisphenol-A polycarbonate resin having a weight-average molecular weight of 26,000, wherein the weight-average molecular weight was equated according to the polystyrene standard sample;

(b) poly L-lactic acid having a weight-average molecular of 100,000, wherein the weight-average molecular weight was equated according to the polystyrene standard sample;

(c) tetrabutyl titanate, wherein the purity thereof was 99.5%;

(d) bisphenol-A bis(diphenyl phosphate), high purity, (commercially available from Daihachi Chemical Industry Co./CR741);

(e) polytetrafluoroethylene mixing powder (Blendex®449).

Using a 25 mm diameter twin-screw extruder, under the conditions of a cylinder temperature 220° C. and a rotation speed of 90 rpm, the blended components were melt blended and taken up from a die as a melted strand, cooled by cooling air, and then a pelletized resin composition was obtained from a standard cutter.

The properties with regard to the obtained resin blend were tested in accordance with the method mentioned in (1)-(4). The test results were listed in Table 3.

TABLE 3

Examples 7-11 and Comparative Example C6

|  |  | Examples | | | | | Comparative Example |
|---|---|---|---|---|---|---|---|
|  |  | 7 | 8 | 9 | 10 | 11 | C6 |
| Bisphenol-A polycarbonate (a) | weight parts | 80 | 80 | 80 | 80 | 90 | 80 |
| Polylactic acid (b) | weight parts | 20 | 20 | 20 | 20 | 10 | 20 |
| Tetrabutyl titanate (c) | weight parts | 0.1 | 0.2 | 0.5 | 0.75 | 0.5 | 0 |
| Bisphenol-A bis(diphenyl phosphate) (d) | weight parts | 15 | 15 | 15 | 15 | 15 | 15 |
| polytetrafluoroethylene mixing powder (e) | weight parts | 1 | 1 | 1 | 1 | 1 | 1 |
| Tensile modulus | MPa | 3149 | 3091 | 3113 | 3206 | 3184 | 2518 |
| Breaking elongation | % | 32.8 | 12.2 | 13.9 | 8.1 | 22.9 | 12.5 |
| Melt Volume Rate MVR | $cm^3$/10 min | 34.2 | 33.3 | 59.2 | 76.6 | 50.7 | 25.7 |
| Impact strength | $kJ/m^2$ | 4.1 | 4.4 | 3.4 | 2.9 | 2.6 | 4.5 |
| Flame retardance property | Rank | V-0 | V-0 | V-0 | V-0 | V-0 | V-1 |

According to Examples 7-11 and Comparative Example C6, the flame retardant (for example, Bisphenol-A bis(diphenyl phosphate)) and fluorine-based resin (for example, polytetrafluoroethylene mixing powder) could be added into the components to improve the flame retardance property and thermal processibility of the blend of aromatic polycarbonate and polylactic acid, and maintain the mechanical properties thereof.

Although the present invention is illustrated through Examples, it is not limited by these Examples in any way. Without departing from the spirit and scope of this invention, those skilled in the art can make any modifications and alternatives. And the protection of this invention is based on the scope defined by the claims of this application.

The invention claimed is:

1. A blend of aromatic polycarbonate and polylactic acid, comprising
   (a) 5-95 weight parts of an aromatic polycarbonate, based on 100 weight parts of component (a) and (b);
   (b) 95-5 weight parts of a polylactic acid, based on 100 weight parts of component (a) and (b); and
   (c) 0.1-0.5 weight parts of a transesterification catalyst, based on 100 weight parts of component (a) and (b), wherein the transesterification catalyst is tetrabutyl titanate.

2. The blend of aromatic polycarbonate and polylactic acid as claimed in claim 1, wherein the blend further comprises
   (d) 1-25 weight parts of a flame retardant, based on 100 weight parts of component (a) and (b); and
   (e) 0.3-2 weight parts of a fluorine-based resin, based on 100 weight parts of component (a) and (b).

3. The blend of aromatic polycarbonate and polylactic acid as claimed in claim 2, wherein the blend further comprises
   (f) 0.5-10 weight parts of an additive, based on 100 weight parts of component (a) and (b); wherein, the additive is at least one selected from the group consisting of lubricants, mold-release agents, nucleating agents, stabilizers, fillers, reinforcing agents, antistatic agents, dyestuff, and pigments.

4. The blend of aromatic polycarbonate and polylactic acid as claimed in claim 1, wherein the amount of the aromatic polycarbonate is 70-90 weight parts, and the amount of the polylactic acid is 30-10 weight parts, based on 100 weight parts of component (a) and (b).

5. The blend of aromatic polycarbonate and polylactic acid as claimed in claim 1, wherein the aromatic polycarbonate is bisphenol-A polycarbonate.

6. The blend of aromatic polycarbonate and polylactic acid as claimed in claim 1, wherein the polylactic acid is selected from the group consisting of poly L-lactic acid and poly D-lactic acid.

7. The blend of aromatic polycarbonate and polylactic acid as claimed in claim 2, wherein the flame retardant comprises at least one component selected from the group consisting of tetrabromine bisphenol-A epoxy oligomers, tetrabromine bisphenol-A carbonate oligomers, brominated epoxy resins, phosphate esters, polyphosphate esters, organic phosphate salts, nitrogenous heterocyclic compounds, silicone resins, silicone oils, aluminum hydroxide, zinc borate, and expanded graphite.

8. The blend of aromatic polycarbonate and polylactic acid as claimed in claim 2, wherein the fluorine-based resin is a mixed powder of polytetrafluoroethylene, and the weight average molecular weight of the mixed powder of polytetrafluoroethylene is 100,000-1,000,000.

9. A method for preparing a blend of aromatic polycarbonate and polylactic acid, comprising blending components (a), (b) and (c)
   (a) 5-95 weight parts of an aromatic polycarbonate, based on 100 weight parts of component (a) and (b);
   (b) 95-5 weight parts of a polylactic acid, based on 100 weight parts of component (a) and (b); and
   (c) 0.1-0.5 weight parts of a transesterification catalyst, based on 100 weight parts of component (a) and (b), wherein the transesterification catalyst is tetrabutyl titanate.

10. The method as claimed in claim 9, further comprising blending (d) and (e) with (a), (b) and (c)
    (d) 1-25 weight parts of a flame retardant, based on 100 weight parts of component (a) and (b); and
    (e) 0.3-2 weight parts of a fluorine-based resin, based on 100 weight parts of component (a) and (b).

11. The method as claimed in claim 10, further comprising blending (f) with (a), (b), (c), (d) and (e)

(f) 0.5-10 weight parts of an additive, based on 100 weight parts of component (a) and (b); the additive is selected from the group consisting of lubricants, mold-release agents, nucleating agents, stabilizers, fillers, reinforcing agents, antistatic agents, dyestuffs, and pigments.

12. The method as claimed in claim 9, wherein the amount of the aromatic polycarbonate is 70-90 weight parts, and the amount of the polylactic acid is 30-10 weight parts, based on 100 weight parts of component (a) and (b).

13. The method as claimed in claim 9, wherein the blending process is carried out at a temperature equal to or above the melting point of component (b).

14. The method as claimed in claim 9, wherein the aromatic polycarbonate is bisphenol-A polycarbonate.

15. The method as claimed in claim 9, wherein the polylactic acid is selected from the group consisting of poly L-lactic acid and poly D-lactic acid.

16. The method as claimed in claim 10, wherein the flame retardant comprises at least one component selected from the group consisting of tetrabromine bisphenol-A epoxy oligomers, tetrabromine bisphenol-A carbonate oligomers, brominated epoxy resins, phosphate esters, polyphosphate esters, organic phosphate salts, nitrogenous heterocyclic compounds, silicone resins, silicone oils, aluminum hydroxide, zinc borate, and expanded graphite.

17. The method as claimed in claim 10, wherein the fluorine-based resin is mixed powder of polytetrafluoroethylene, and the weight average molecular weight of the mixed powder of polytetrafluoroethylene is 100,000-1,000,000.

18. A mechanical product or part, an electronic equipment and/or part, a construction material, and/or a commodity, comprising a blend of claim 1.

19. A fixture, bearing, gear, valve, stent, base, pallet and/or engine component of a mechanical equipment, shell, cover cap, parts, switch, stent, base and/or pallet of an electronic equipment, membrane plate, sunlight panel, endurance panel, light box, window frame, curtain wall, food container, liquid container, toy, office appliance, sports goods and/or a compact disc, comprising a blend as claimed in claim 1.

20. A method for preparing mechanical product or parts, electronic equipments or parts, construction material, and/or commodities comprising employing a blend as claimed in claim 1.

21. A blend of aromatic polycarbonate and polylactic acid, consisting essentially of
(a) 5-95 weight parts of an aromatic polycarbonate, based on 100 weight parts of component (a) and (b);
(b) 95-5 weight parts of a polylactic acid, based on 100 weight parts of component (a) and (b); and
(c) 0.1-0.5 weight parts of a transesterification catalyst, based on 100 weight parts of component (a) and (b), wherein the transesterification catalyst is tetrabutyl titanate.

22. A method for preparing a blend of aromatic polycarbonate and poly lactic acid, comprising blending components consisting essentially of (a), (b) and (c)
(a) 5-95 weight parts of an aromatic polycarbonate, based on 100 weight parts of component (a) and (b);
(b) 95-5 weight parts of a polylactic acid, based on 100 weight parts of component (a) and (b); and
(c) 0.1-0.5 weight parts of a transesterification catalyst, based on 100 weight parts of component (a) and (b), wherein the transesterification catalyst is tetrabutyl titanate.

23. A blend of aromatic polycarbonate and polylactic acid, comprising
(a) 5-95 weight parts of an aromatic polycarbonate, based on 100 weight parts of component (a) and (b);
(b) 95-5 weight parts of a polylactic acid, based on 100 weight parts of component (a) and (b); and
(c) 0.05-1 weight parts of a transesterification catalyst, based on 100 weight parts of component (a) and (b), wherein the transesterification catalyst is tetrabutyl titanate.

* * * * *